United States Patent
Banks

(10) Patent No.: US 6,860,702 B1
(45) Date of Patent: Mar. 1, 2005

(54) HYDRAULICALLY STOWABLE AND EXTENDABLE RAMP

(76) Inventor: Raymond L. Banks, P.O. Box 609, Double Springs, AL (US) 35553

( * ) Notice: Subject to any disclaimer, the term of this patent is extended or adjusted under 35 U.S.C. 154(b) by 39 days.

(21) Appl. No.: 10/293,951

(22) Filed: Nov. 12, 2002

(51) Int. Cl.[7] ............................................... B65G 67/02
(52) U.S. Cl. ...................................................... 414/537
(58) Field of Search ................................ 414/480, 475, 414/537; 293/118; 280/149.2, 656

(56) References Cited

U.S. PATENT DOCUMENTS

| | | | | |
|---|---|---|---|---|
| 3,834,565 A | * | 9/1974 | Goodman et al. | 414/537 |
| 3,866,771 A | * | 2/1975 | Reid et al. | 414/537 |
| 4,498,836 A | * | 2/1985 | Love | 414/537 |
| 4,647,270 A | * | 3/1987 | Maloney | 414/470 |
| 5,388,949 A | * | 2/1995 | Berg | 414/480 |
| 5,678,984 A | * | 10/1997 | Petersen | 414/537 |
| 6,386,819 B1 | * | 5/2002 | Schultz | 414/537 |

* cited by examiner

*Primary Examiner*—Eileen D. Lillis
*Assistant Examiner*—Charles A. Fox
(74) *Attorney, Agent, or Firm*—Bradley, Arant, Rose & White, LLP

(57) ABSTRACT

A linear hydraulic actuator mounted to the frame of a trailer to drive a slider longitudinally and return the slider to its rest position urging a ramp about a horizontal transverse axis such that the ramp moves between a stowed position and an extended position. The slider is operatively connected to a parallel rod which is connected to a bell crank on a pivotally mounted stand beneath the end of the trailer such that as the slider moves the stand is concomitantly urged between a stowed position and a deployed ground engaging position.

8 Claims, 3 Drawing Sheets

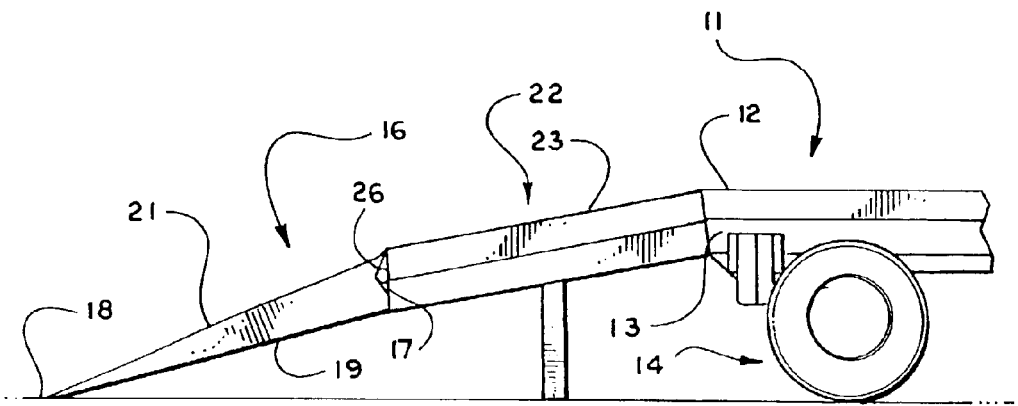
*Fig_1*
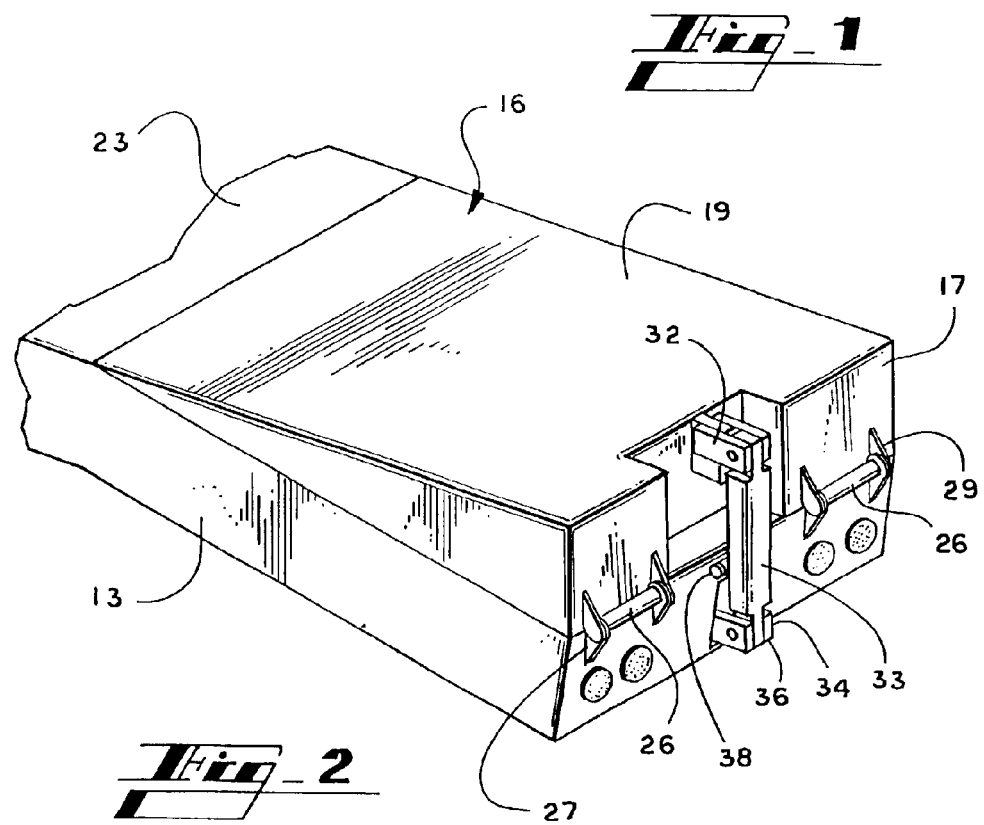
*Fig_2*

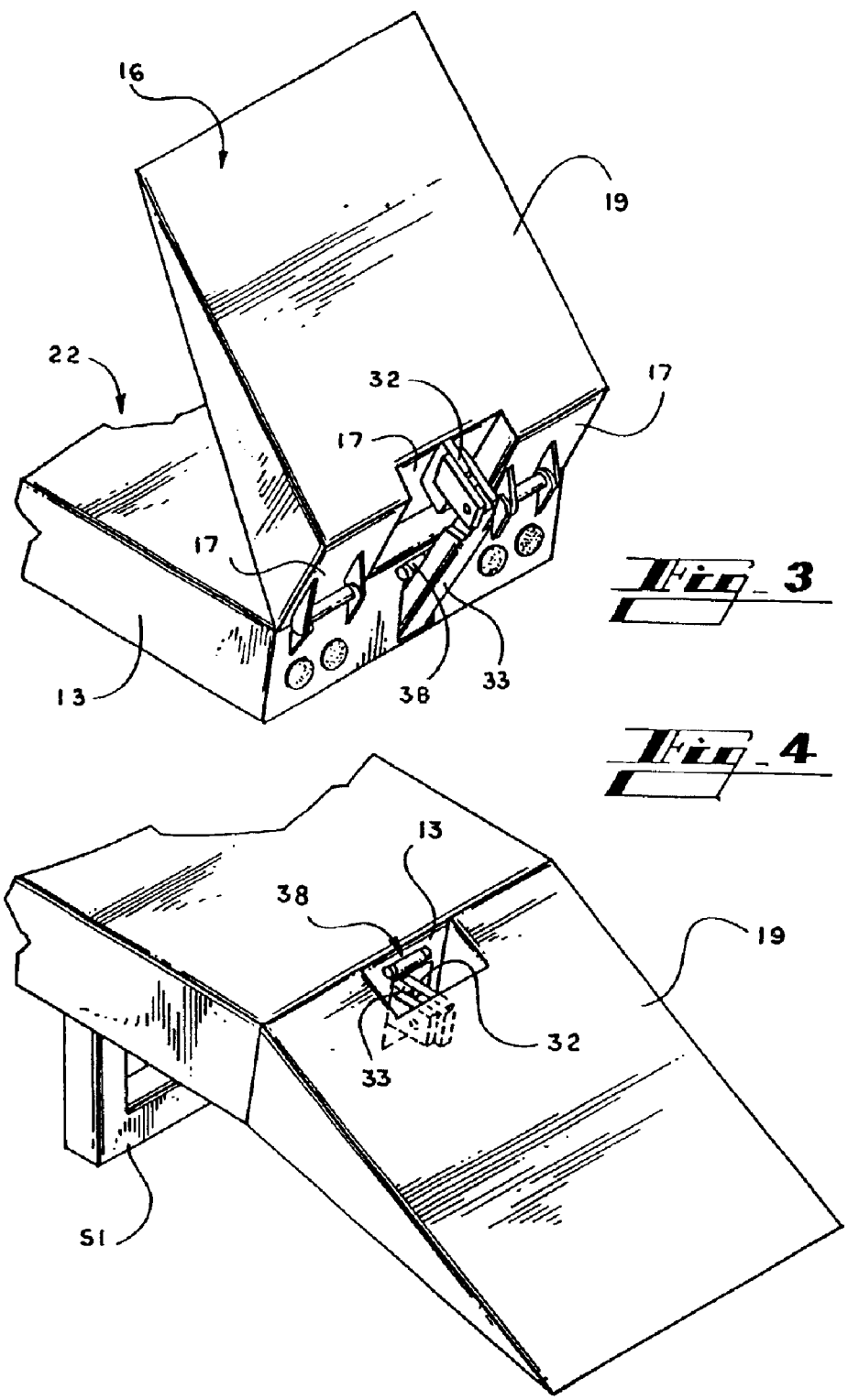

US 6,860,702 B1

HYDRAULICALLY STOWABLE AND EXTENDABLE RAMP

FIELD OF THE INVENTION

The present invention relates to the field of draft trailers and more particularly to transport trailers used to transport equipment or other vehicles. In greater particularity, these trailers usually include a flat bed, and may include an inclined platform known as a beaver tail, and a ramp attached to the beaver tail platform. The invention further relates to the mechanism for stowing and extending such ramps from the ends of such trailers.

BACKGROUND

Flatbed trailers and the like used to transport heavy equipment and large vehicles are necessarily built with considerable attention to the strength and durability aspects. Consequently, the components are well constructed and employ a relatively large mass of material. As is well known, wheeled equipment and vehicles are driven on to the trailer over ramps that are pivotally mounted to the rear of the trailer. These ramps are heavy and difficult to move from an extended position to a stowed position. Accordingly, many accordion type ramps have hydraulic actuators associated with them to move the ramp to the selected position. Likewise, some trailers use hydraulic assistance to extend support stands beneath the rear of the trailer while the heavy equipment is moving onto and off the trailer. The known systems utilize multiple actuators or are not effective and require the operator to dismount from the draft vehicle or otherwise acquire assistance. Accordingly, a simple effective mechanism is needed.

SUMMARY OF THE INVENTION

It is the object of the present invention to provide a ramp positioning mechanism with the minimum effective utilization of equipment such that a simple to maintain and operate system can be attained.

It is another object of the invention to enable the operator to control the motion of the ramp in all positions of deployment.

These and other objects of the invention are accomplished by a novel linkage mechanism connecting the ramp, the stand and a single actuator such that the actuator is deployed to control the movement of both the stand and the ramp. Specifically, a linear hydraulic actuator is mounted to the frame beneath the beavertail portion of the trailer to drive a slider longitudinally and return the slider to its rest position. The movement of the slider urges the ramp about a horizontal transverse axis such that the ramp moves between a stowed position and an extended position. The slider s operatively connected to a parallel rod which is connected to a bell crank on the pivotally mounted stand such that as the slider moves the stand is likewise urged between a stowed position and a deployed position.

BRIEF DESCRIPTION OF THE DRAWINGS

Apparatus embodying features of the present invention are depicted in the accompanying drawings which form a portion of this invention and wherein:

FIG. 1 is a side elevational view of the rear of a draft trailer showing the beavertail with a ramp and stand in the extended position;

FIG. 2 is a perspective view of the ramp stowed atop the beaver tail;

FIG. 3 is a perspective view of the ramp intermediate the stowed and retracted position;

FIG. 4 is a perspective view of the beavertail with the ramp and stand in the extended position;

DESCRIPTION OF THE PREFERRED EMBODIMENT

Figure 5:
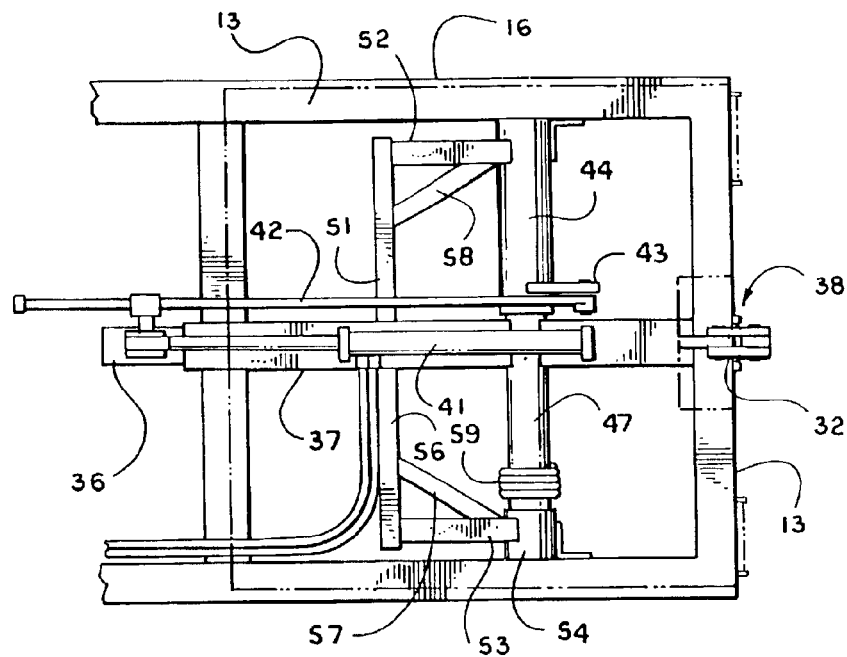
FIG. 5 is a plan view of the slider and frame assembly beneath the beavertail with the ramp shown in dotted line in the stowed position; and, FIG. 6 is a plan view of the slider and frame assembly beneath the beavertail with the ramp shown in dotted line in the extended position.

Referring to the drawings for a clearer understanding of the invention it is to be understood that the present invention is depicted as an improvement to a draft trailer and in the drawings the draft trailer is depicted as a beavertail trailer, however the principles of the invention may be applied to any draft trailer which has a source of hydraulic power such as from the associated tractor to operate the mechanism. Referring to FIG. 1 it may be seen that trailer 11 is a flatbed trailer having a bed 12 mounted atop a frame 13 and supported on a set of wheels 14 which are conventionally attached using appropriate bogies or like connections. In general, the frame is conventional as well comprising a plurality of longitudinal I beams and transverse girders.

Ramp 16 is a generally wedge shaped weldment tapering from a base plate 17 to a nose 18. A flat deck plate 19 and a rampway 21 extend from base plate 17 and intersect at nose 19. In the beavertail configuration, the beavertail 22 has a fixed ramp portion 23 which aligns with rampway 21 to form a continuing loading incline when the ramp 16 is in the extended position. Rampway 21 and ramp portion 23 are in cooperative abutting relation ship when ramp 16 is in the stowed position and deck plate 19 is then aligned with the remaining bed 12 of trailer 11 with extends forwardly of beavertail 22. It will be appreciated that rampway 21 and ramp portion 23 may be appropriately treaded for cooperative engagement when in the stowed position.

As best seen in FIGS. 2 and 3 ramp 16 is connected to beavertail 22 by a pair of hinges 26 spaced apart on the trailer frame 13. Hinges 26 may be of double or single hinge configuration. That is to say each hinge may have a single set of clevis plates 27 mounted to trailer frame 13 or may also have a set of clevis plates 28 mounted to base plate 17 with a hinge pin 29 and sleeve 31 supported in the clevis plates to permit pivotal movement of the ramp about a horizontal axis. Ramp 16, and consequently deck plate 19 and rampway 21 are notched intermediate hinges 26 and base plate 17 is recessed in the notch to provide an open area between hinges 26. Base plate 17 has a clevis connection 32 formed thereon to provide pivotal attachment to one end of a link 33. A second end of link 33 is similarly connected at 34 to a slider 36, mounted within slider tube 37 affixed to the frame beneath ramp portion 23 and extending longitudinally of trailer 11. Slider 36 is extendable beyond frame 13 and is spaced below the horizontal axis passing through hinge pins 29. Mounted to frame 13 intermediate hinges 26 is a bearing member 38, which may be a roller bearing or an antifriction surface, aligned with link 33 and against which link 33 abuts with slider 36 retracted in frame 13.

Figure 6:
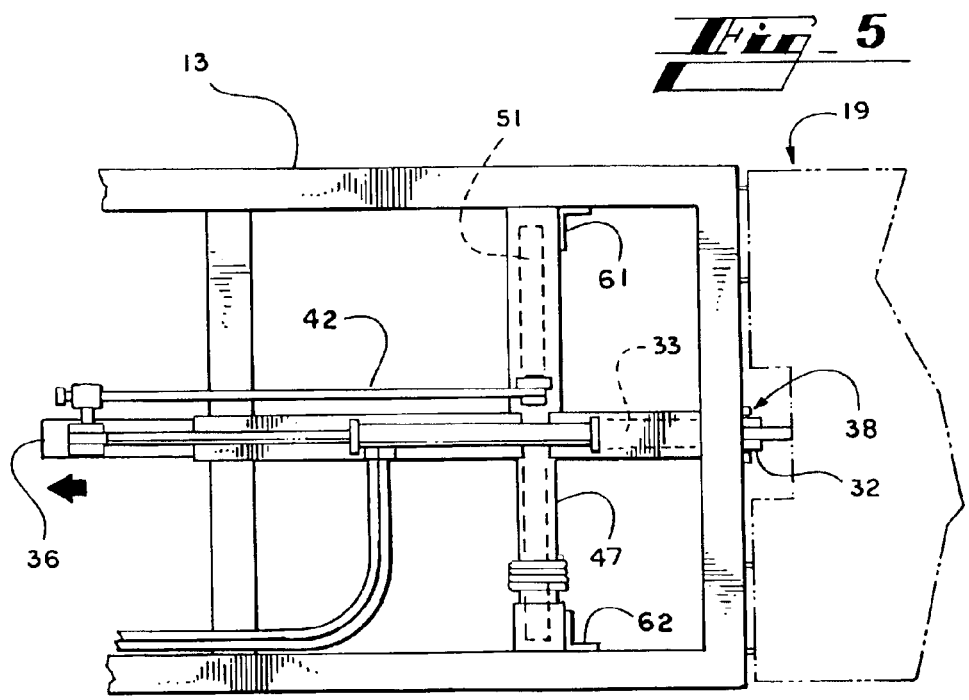

As best seen in FIGS. 5 and 6, slider 36 is connected to a double acting hydraulic linear actuator 41 having a dead end connected to frame 13. Actuator 41 is conventionally powered from a source of hydraulic pressure such as may be available on an associated tractor. Also connected to slider 36 and actuator 41 is a link rod 42 extending parallel slider 36 within frame 13 and moveable concomitantly with slider 36 responsive to actuator 41. Link rod 42 is connected to a bell crank 43, which extends radially from a stand pivot 44. Stand pivot 44 is mounted to frame 13 for rotational movement about an axis transverse to slider 36. In greater detail, pivot 44 may be a sleeve mounted for rotation about a cylindrical transverse frame member 47. A stand 51 is formed by a first leg 52 extending radially from stand pivot 44 and a second leg 53 extending from a stub sleeve 54 also mounted for rotation about cylindrical frame member 47. A stand beam 56 is welded to and extends between legs 52 and 53 and is stabilized therewith by braces 57 and 58. A torsion spring 59 is mounted about cylindrical frame member 47 and affixed to brace 57 such that stand 51 is urged to a stowed position as shown in FIG. 5. A pair of stops 61 and 62 are welded to frame 13 and prevent stand 51 from moving past a vertical orientation.

In operation, an operator have a control mechanism for controlling the hydraulic actuator, the exact nature of which is not germane to the invention but which may be mounted on the trailer or in the cab of an associated tractor initiates movement of actuator 41 by applying hydraulic pressure. Assuming that ramp 16 is in the stowed position such that it rests atop the beavertail 22 with rampway 21 and ramp portion 23 abutting, actuator 41 urges slider 36 and rod 42 forwardly away from ramp 16, causing link 33 to bear against bearing member 38 which provides a fulcrum for link 33. Link 33 thus exerts a rearward pulling force on base plate 17 causing ramp 16 to rotate upwardly and rearwardly about hinges 26 as link 33 follows slider 36. As ramp 16 pivots link 33 is urged away from bearing member 38 and urges ramp 16 past vertical in a downward and rearward motion until link 33 is partially received in frame 13 and ramp 16 is lowered to its full ground engaging extended position. Concomitantly, rod 42 urges bell crank 43 forwardly thus urging stand 51 downwardly and rearwardly from its stowed position against the influence of spring 59. As ramp 16 reaches its fully extended position, stand 51 is forced to its fully extended vertical position in which it bears against the ground or surface on which the trailer rests. It will be appreciated that stand 51 provides support to beavertail 22 when heavy equipment is loaded onto or off trailer 13. Obviously, the operator reverses actuator 41, urging slider 36 and rod 24 rearwardly such that link 33 urges the ramp upwardly and forwardly while bell crank 43 and spring 59 urge the stand from the ground engaging position upwardly and forwardly. When actuator 41 has reached its full extent of travel, ramp 16 and stand 51 are retracted to their stowed positions.

While I have shown my invention in a single form it is to be understood that the disclosure is for purposes of illustration rather than limitation and my invention limited only by the scope of the appended claims.

What I claim is:

1. In a trailer having an elongated bottom supported on a frame which is in turn supported on a plurality of wheels for transit over a roadway, the improvement comprising:
  a. a ramp, pivotally connected to said frame at one end thereof and selectively movable between a stowed position atop said frame and substantially flush with said bottom and an extended position extending downwardly and outwardly from said frame and substantially aligned with a portion of said bottom;
  b. a stand, pivotally connected to said frame beneath said portion of said bottom for concomitant motion with said ramp between a stowed position and an extended position;
  c. a hydraulic actuator mounted to said frame and extending there along, operably connected between a source of hydraulic pressure and said ramp and stand, for urging said ramp and stand to said selected positions, wherein said hydraulic actuator extends longitudinally of said frame and said ramp pivots about and axis transverse of said frame, said actuator having affixed there to an actuator rod selectively extending below said axis; a link member pivotally connected at one end to said actuator rod for pivotal motion about a substantially horizontal axis parallel to transverse axis and pivotally connected and a second end thereof to said ramp for pivotal motion about a third axis parallel to said transverse axis, said link member being perpendicular to and intersecting said transverse axis with said ramp is in said stowed position and offset from said transverse axis with said ramp in its extended position.

2. The improvement as defined in claim 1 further comprising a bearing member mounted to said frame intermediate said actuator rod and said ramp and aligned with said link member such
  that said link member bears against said bearing member when said ramp is in said stowed position.

3. The improvement as claimed in claim 1 wherein retraction of said actuator rod urges said link against said bearing member providing a sliding leverage seat for forcing said ramp to pivot upward about said transverse axis to an intermediate upright position, whereupon further retraction of said rod urges said ramp from said upright position to said extended position.

4. The improvement as defined in claim 1 further comprising a secondary actuator rod mounted parallel to said actuator and connected at one end to said stand for urging said stand between said stowed position and said extended position.

5. The improvement as defined in claim 4 wherein said secondary actuator rod is connected to a spring biasing said stand toward said stowed position such that longitudinal movement of said actuator rod will cause said stand to move between said stowed position to said extended position such that said stand and said ramp move concomitantly.

6. In a trailer having an elongated bottom supported on a frame which is in turn supported on a plurality of wheels for transit over a roadway, the improvement comprising:
  a. a ramp, pivotally connected to said frame at one end thereof and selectively movable between a stowed position atop said frame and substantially flush with said bottom and an extended position extending downwardly and outwardly from said frame and substantially aligned with a portion of said bottom; and,
  b. a hydraulic actuator mounted to said frame and extending there along, operably connected between a source of hydraulic pressure and said ramp and stand, for urging said ramp and stand to said selected positions wherein said hydraulic actuator extends longitudinally of said frame and said ramp pivots about and axis transverse of said frame, said actuator having affixed there to an actuator rod selectively extending below said axis; a link member pivotally connected at one end to said actuator rod for pivotal motion about a substantially horizontal axis parallel to transverse axis and pivotally connected and a second end thereof to said ramp for pivotal motion about a third axis parallel to said transverse axis, said link member being perpendicular to and intersecting said transverse axis with said ramp is in said stowed position and offset from said transverse axis with said ramp in its extended position.

7. The improvement as claimed in claim 6 further comprising a stand, pivotally connected to said frame beneath said portion of said bottom for concomitant motion with said ramp between a stowed position and an extended position.

8. The improvement as defined in claim 7 further comprising a secondary actuator rod mounted parallel to said actuator and connected at one end to said stand for urging said stand between said stowed position and said extended position.

* * * * *